No. 748,545. PATENTED DEC. 29, 1903.
R. TROEHLER.
BARREL FEEDING APPARATUS FOR BARREL WASHING MACHINES.
APPLICATION FILED JULY 24, 1901.
NO MODEL. 2 SHEETS—SHEET 2.
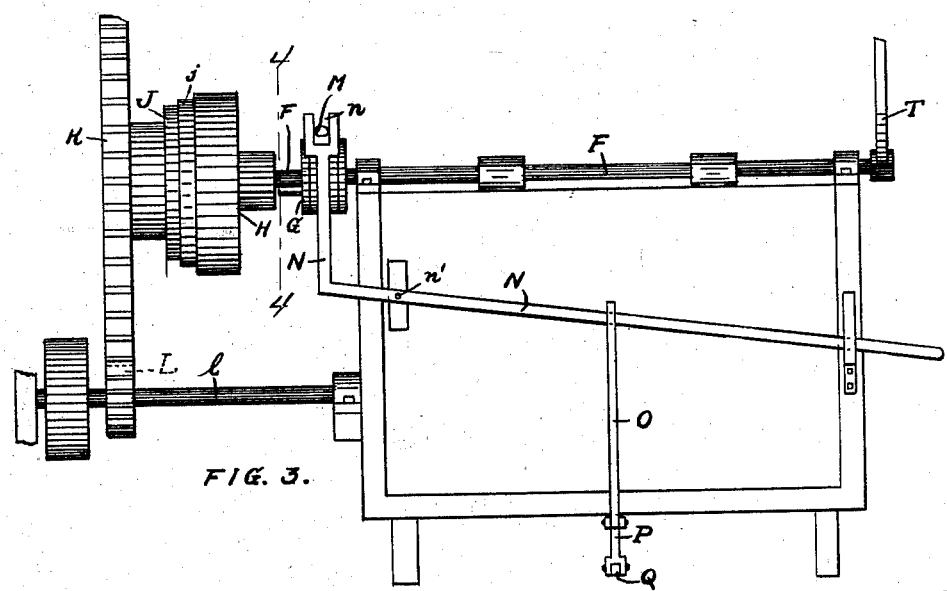
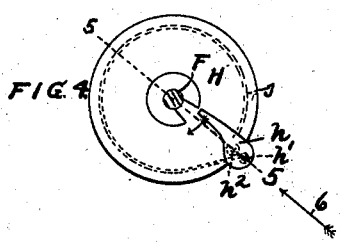
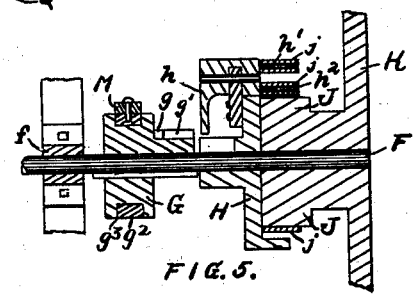
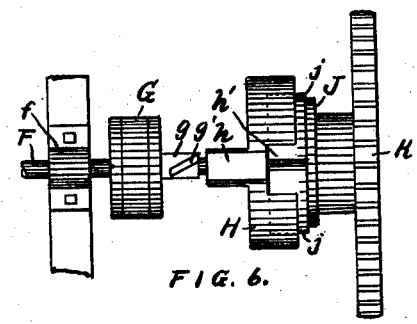
Witnesses
Mary P. Singleton
Brayton G. Richards
Inventor
Rudolph Troehler
By Attorney No. 748,545. Patented December 29, 1903.

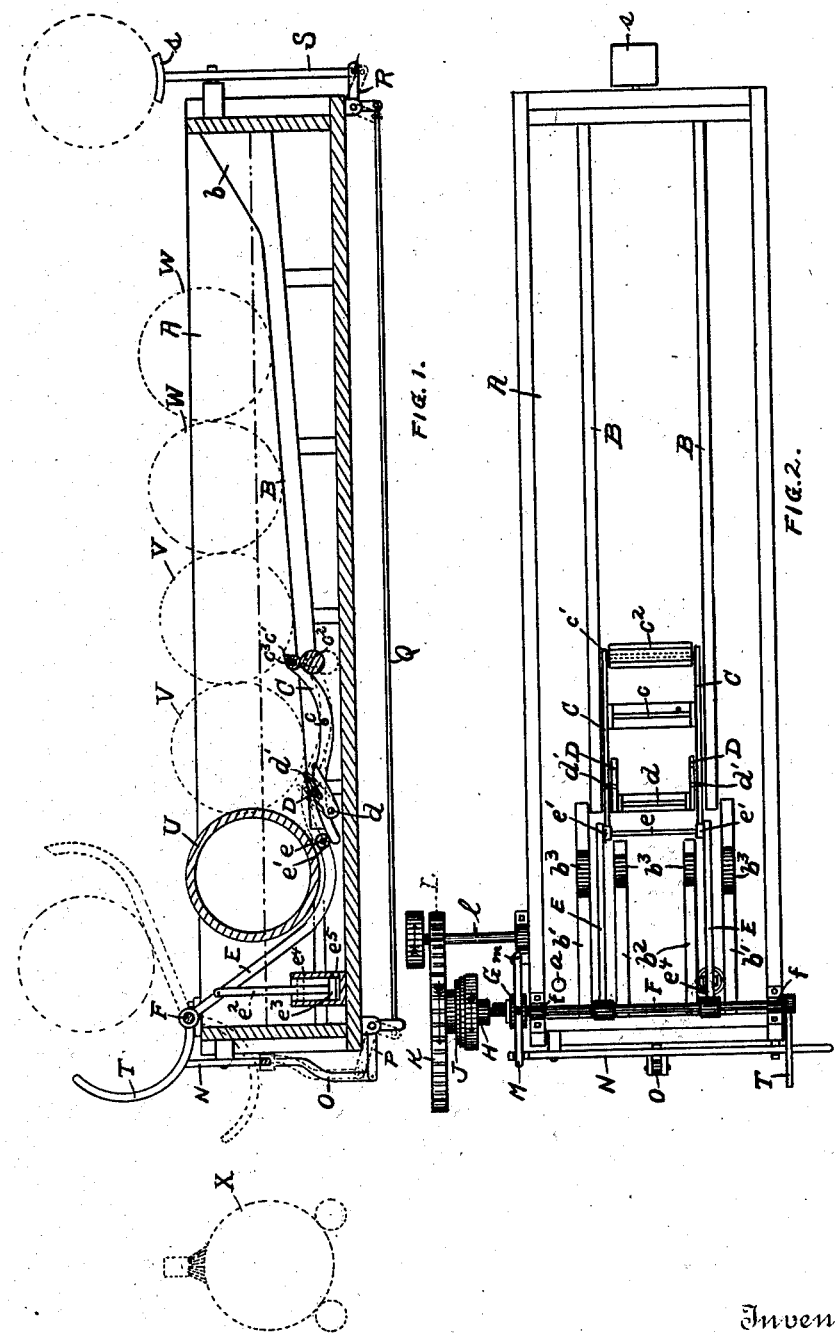

UNITED STATES PATENT OFFICE.

RUDOLPH TROEHLER, OF CINCINNATI, OHIO.

BARREL-FEEDING APPARATUS FOR BARREL-WASHING MACHINES.

SPECIFICATION forming part of Letters Patent No. 748,545, dated December 29, 1903.

Application filed July 24, 1901. Serial No. 69,574. (No model.)

*To all whom it may concern:*

Be it known that I, RUDOLPH TROEHLER, a citizen of the United States, residing at Cincinnati, in the county of Hamilton and State of Ohio, have invented certain new and useful Improvements in Barrel-Feeding Apparatus for Barrel-Washing Machines, of which the following is a specification.

The object of my invention is to provide apparatus for automatically feeding barrels to barrel-washing machines and also to provide for the thorough cleansing of the inside of the barrel.

In the drawings, Figure 1 is a vertical longitudinal section of an apparatus embodying my invention; Fig. 2, a top plan view of the same; Fig. 3, a rear end view of the same on an enlarged scale; Fig. 4, a section on line 4 4 of Fig. 3; Fig. 5, a section on line 5 5 of Fig. 4, and Fig. 6 an elevation looking in the direction of the arrow 6 in Fig. 4.

Reference-letter A denotes a trough; B, inclined guides or tracks in trough A; C, curved arms adapted to act as stops for barrels rolling on tracks B; D, supplemental stops for the barrels; E, swinging hook-arms adapted to receive the barrels from tracks B; F, a shaft carrying arms E; G, a male clutch splined to shaft F; H, a female clutch loosely mounted on shaft F; J, a friction-wheel loosely mounted on shaft F; K, a large cog-wheel carried by friction-wheel J and driven by a small cog-wheel L on shaft $l$; M, a lever adapted to throw clutch G into and out of engagement with clutch H; N, a lever for operating lever M; O, a link connecting lever N with bell-crank lever P; Q, a link connecting bell-crank lever P with bell-crank lever R; S, a post connected with bell-crank lever R and having a rest $s$ for barrels, and T a trip-arm on shaft F, adapted to trip lever N.

The trough A is partially full of water and may be of any desired construction, but is preferably long enough to accommodate a number of barrels placed therein sidewise and wide enough to accommodate the length of barrels. In its bottom trough A may be provided with a plug $a$ for draining water therefrom.

The tracks B are slightly inclined through the greater portion of their length, with a sharp rise at their forward ends to form incline $b$ and are placed near enough together to accommodate kegs as well as barrels. At their lower ends tracks B lead to rests $b'$ and $b^2$, which are substantially horizontal and provided with concave surfaces $b^3$, adapted to receive and retain the packages. Rests $b'$ are placed far enough apart to support barrels, and rests $b^2$ are near enough together to support the smallest kegs, one or the other serving to support any packages between these sizes.

Near the lower end of tracks B arms C are pivoted on rod $c$, so as to permit their noses $c'$ to project above the level of the tracks to act as stops for barrels rolling thereon or to drop below that level, so as to permit the passage of the barrels, for which latter purpose they are provided with a weight $c^2$, hanging on rod $c^3$, which connects noses $c'$.

The supplemental stops D are pivoted to rod $d$ and have a slot-and-pin connection $d'$ with arms C, so that when noses $c'$ are depressed to permit the passage of a barrel they are raised to intercept it. At their outer ends arms E are connected by rod $e$, which carries cushions $e'$, adapted to contact with the lower ends of stops C and raise noses $c'$. One of the arms E is provided with a rod $e^2$ and piston $e^3$, working in cylinder $e^4$, which is provided with opening $e^5$ to permit the gradual escape of water under piston $e^3$, and thus moderate the descent of arms E.

Shaft F is mounted in bearings $f$ on the sides of trough A and is provided with male clutch G, splined thereto. The female clutch H is loosely mounted on shaft F and carries a pivoted arm $h$, which carries pins $h'$ and $h^2$, located outside and inside the pivotal point, respectively. A strap or band $j$ loosely encompasses friction-wheel J and has its ends attached to pins $h'$ and $h^2$. Mounted on clutch G is a guide $g$, provided with oblique slot $g'$, adapted to engage the inner end $h^3$ of arm $h$ when clutch G approaches clutch H. Owing to the oblique direction of slot $g'$ the approach of clutch G causes the inner end of arm $h$ to be carried in the direction of the arrow on Fig. 5, thus tightening the strap $j$ on friction-wheel J, causing clutch H to be frictionally connected with wheel J. Wheel J is constantly and slowly rotated by means of cog-wheels K and L and shaft $l$ in the direction indicated by the arrow in Fig. 2, so that when clutch G is thrown into engagement with clutch H shaft F is slowly rotated to raise arms E.

The mechanism which operates clutch G consists of the lever M, which is pivoted to bearing $m$ on the side of trough A and has a slot-and-pin connection with ring $g^2$, mounted in channel $g^3$ in clutch G. At its outer end lever M is engaged by slot $n$ in lever N, which is pivoted at $n'$ to the rear end of trough A and extends beyond the outer side of trough A in the path of arm T on shaft F. Link O, bell-crank lever P, link Q, and bell-crank lever R serve to connect lever N with post S, so that depression of the last throws clutch G into engagement with clutch H.

The barrel-washing machine in conjunction with which my feeding apparatus is used may be of any desired construction; but the apparatus illustrated in the drawings is especially designed for use in connection with my barrel-washing machine for which Letters Patent of the United States were granted July 12, 1898, No. 607,097, a diagrammatic view of which is indicated in dotted lines to the left of Fig. 1.

To explain the operation, let us suppose the apparatus to have been in operation so that a barrel U is in position for being fed, a barrel V is on tracks B, stopped by noses $c'$ of arms C, and a number of barrels W are on tracks B above barrel V. The operator then places a barrel on rest $s$ on post S, which depresses it and throws clutch G into engagement with clutch H. This causes shaft F to slowly rotate to raise arms E and barrel U. As soon as the weight of arms C is raised from the lower ends of arms C weight $c^2$ swings arms C' on pivot-rod $c$ to cause noses $c'$ to drop and stops D to raise, so that the barrel released by the dropping of noses $c'$ is intercepted by stops D, and all the barrels move down a corresponding distance. When arms E reach a position a little above the horizontal, the barrel U rolls down them and over the end of trough A, striking barrel X in the washing-machine with impetus enough to drive it out and take its place. At the time the barrel leaves arms E the trip-arm T on shaft F has rotated far enough to contact with lever N and depress it, thus withdrawing clutch G from clutch H to release shaft F and permit arms E to drop back. When arms E fall, cushions $e'$ strike the lower ends of arms C, raising noses $c'$ to stop the next barrel W and lowering stops D to permit barrel V to roll onto rests $b'$ immediately above arms E, where it will be seized by arms E on their next ascent and delivered to the washing-machine. As the barrels or kegs roll down tracks B onto rests $b'$ or $b^2$ a certain amount of water enters their bung-holes, which when they are delivered to the washing-machine and rapidly rotated thereon thoroughly washes and cleanses their insides, while the washing-machine performs the same service for their outsides.

While the exemplification of my invention illustrated in the drawings and described therein is the preferred form, I do not wish to be limited to this exact construction.

What I claim as new, and desire to secure by Letters Patent, is—

1. The combination in a barrel-feeding apparatus of a stationary inclined track; a stop adapted to hold a barrel stationary on the track; a supplemental stop adapted to intercept a barrel released by the first stop; mechanism for alternately throwing each of the stops into operative position and withdrawing the other; swinging arms adapted to receive the barrels from the track and raise and discharge them; and means for operating the swinging arms, substantially as specified.

2. The combination in a barrel-feeding apparatus for barrel-washing machines, of a trough containing water; an inclined track in the trough; a stop adapted to hold a barrel stationary on the track; a supplemental stop adapted to intercept a barrel released by the first stop; mechanism for alternately throwing each of the stops into operative position and withdrawing the other, swinging arms adapted to receive the barrels from the track and raise and discharge them; mechanism in the path of the arms for operating stops; and means for operating the arms, substantially as specified.

3. The combination in a barrel-feeding apparatus for barrel-washing machines, of a trough containing water; an inclined track in the trough; an arm pivoted to have its end swing above and below the traveling surface of the track; a supplemental arm pivoted to have its end swing above and below the traveling surface of the track at a point below the point of operation of the first arm; a connection between the arms whereby throwing one of the arms into operative position withdraws the other; means for alternately throwing one of the arms into operative position and withdrawing it; swinging arms adapted to receive the barrels from the track and raise and discharge them; and means for operating the arms, substantially as specified.

4. The combination in a barrel-feeding apparatus for barrel-washing machines, of a trough containing water; an inclined track in the trough; an arm pivoted to have its end swing above and below the traveling surface of the track; a supplemental arm pivoted to have its end swing above and below the traveling surface of the track at a point below the point of operation of the first arm; a connection between the arms whereby throwing one of the arms into operative position withdraws the other; means for alternately throwing one of the arms into operative position and withdrawing it; a shaft; arms mounted on the shaft and adapted to receive the barrels from the track; clutch mechanism adapted to drive the shaft to raise the arms and discharge a barrel thereon; and tripping mechanism connected with the shaft adapted to operate the clutch mechanism to release the shaft from the driving force, substantially as specified.

5. The combination in a barrel-feeding apparatus for barrel-washing machines, of a trough containing water; an inclined track in the trough; an arm pivoted to have its end swing above and below the traveling surface of the track; a supplemental arm pivoted to have its end swing above and below the traveling surface of the track at a point below the point of operation of the first arm; a connection between the arms whereby throwing one of the arms into operative position withdraws the other; means for alternately throwing one of the arms into operative position and withdrawing it; a shaft; arms mounted on the shaft and adapted to receive the barrels from the track; a clutch splined to the shaft; a clutch loosely mounted on the shaft; a friction-wheel; a friction-strap encompassing the wheel, a pivoted arm on the loose clutch having connection with the ends of the strap on opposite sides of its pivotal point; an oblique slot on the splined clutch adapted to engage the pivoted arm, on the approach of the clutches, and swing the arm to apply the strap to the wheel; a lever for operating the splined clutch; a trip-arm on the shaft; and trip mechanism in the path of the trip-arm, for operating the lever to withdraw the clutch, substantially as specified.

6. The combination in a barrel-feeding apparatus for barrel-washing machines, of a trough containing water; an inclined track in the trough; a curved arm pivoted to have its end swing above and below the traveling surface of the track; a supplemental arm pivoted to have its end swing above and below the traveling surface of the track at a point below the point of operation of the first arm; a slot-and-pin connection between arms whereby when one is operative the other becomes inoperative; a shaft mounted on the top of the discharge end of the trough; arms mounted on the shaft and adapted to receive barrels from the track; mechanism in the path of the last-mentioned arms connected with the slot-and-pin-connected arms for depressing the supplemental arm; a weight adapted to depress the main slot-and-pin-connected arm; a clutch loosely mounted on the shaft; a friction-wheel; a friction-strap encompassing the wheel; a pivoted arm on the loose clutch having connection with the ends of the strap on opposite sides of its pivotal point; an oblique slot on the splined clutch, adapted to engage the pivoted arm on the approach of the clutches and swing the arm to apply the strap to the wheel; a lever for operating the splined clutch, a trip-arm on the shaft; and trip mechanism in the path of the trip-arm, for operating the lever to withdraw the clutch, substantially as specified.

7. The combination in a barrel-feeding apparatus for barrel-washing machines, of trough A, tracks B, arms C; supplemental arms D connected with arms C by slot and pin $d'$; arms E on shaft F adapted to contact with arms C to raise their noses $c'$ into operative position, weight $c^2$ on arms C; clutch G splined to shaft F; clutch H loosely mounted on shaft F and carrying pivoted arm $h$; friction-wheel J; means for operating friction-wheel J; strap $j$ encompassing wheel J and having its opposite ends connected with pins $h'$ and $h^2$ on arm $h$; plate $g$ on clutch G; slot $g'$ in plate $g$; lever M for operating clutch G; lever N for operating lever M; link O, bell-crank lever P, link Q, bell-crank lever R and post S for operating lever N; and trip T on shaft F for operating lever N, substantially as specified.

8. The combination with tracks B, of arms C; supplemental arms D having a slot-and-pin connection $d'$ with arms C; weight $c^2$; and means for throwing arms C into operative position and releasing them, substantially as specified.

RUDOLPH TROEHLER.

Witnesses:
 RICHD. TURNER, Jr.,
 CHARLES MILLER.